April 13, 1954     C. D. WILLSON     2,674,775
MAKING MOLDED PANELS
Filed July 3, 1946
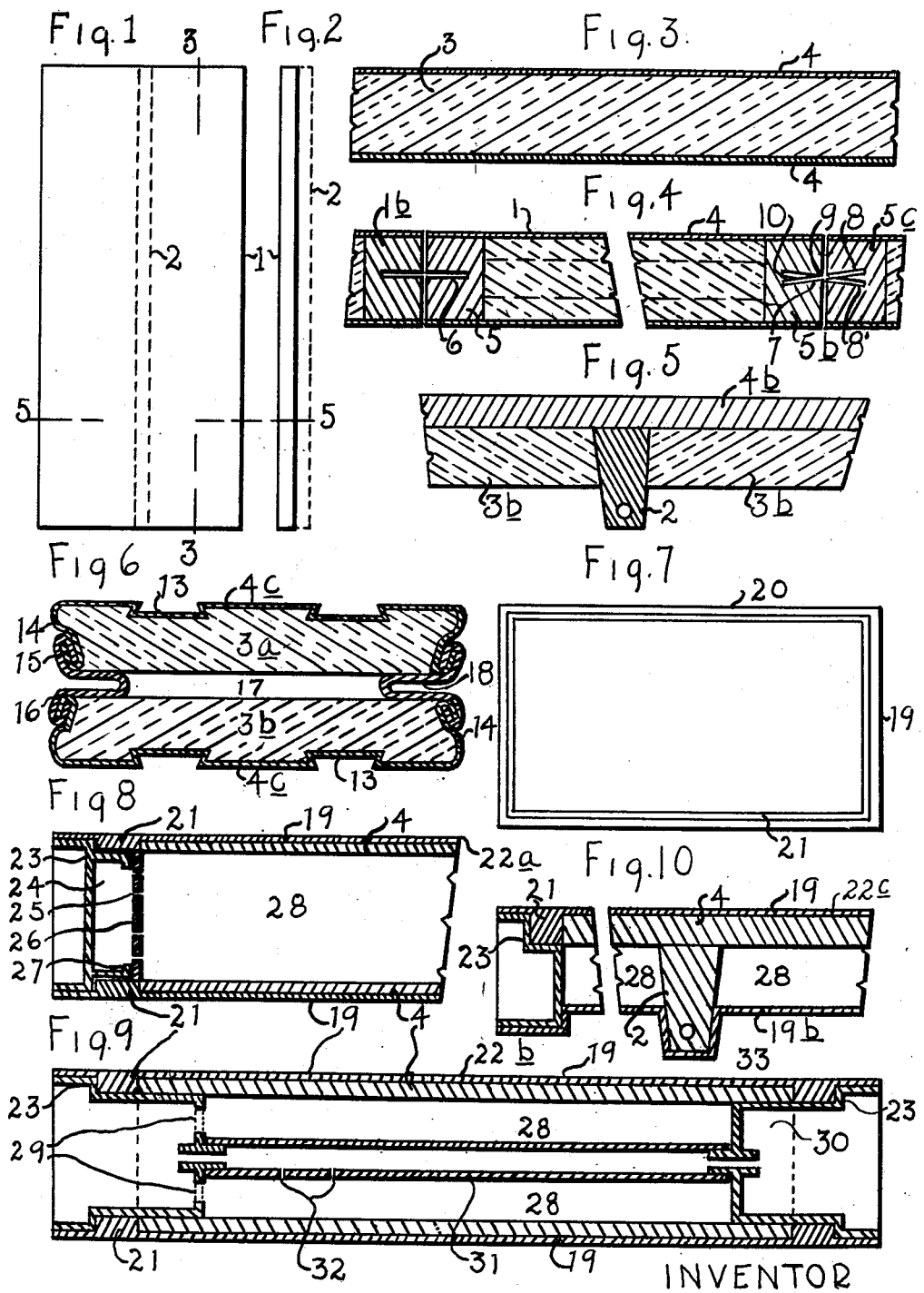
INVENTOR
Corwin D Willson Patented Apr. 13, 1954

2,674,775

UNITED STATES PATENT OFFICE 2,674,775

MAKING MOLDED PANELS

Corwin D. Willson, Flint, Mich.

Application July 3, 1946, Serial No. 681,400

12 Claims. (Cl. 25—155)

This invention relates to the thermally insulative enclosure of space whereby a house shell, for example, may be made to comprise a preponderant bulk of low-density highly cellular core composition fixed between rigid, relatively thin but strong opposite facings highly resistant both to weather and to fire. More particularly, the invention relates to sections of such an enclosure and to means of making molded sections in the form of pre-finished panels from a wide variety of raw ingredients, including both cold-setting and thermo-setting binders. This invention is a continuation-in-part of my co-pending applications Ser. No. 485,642 filed May 4, 1943 and since abandoned, and Ser. No. 506,772 filed October 18, 1943 and since matured as Patent No. 2,548,576 on April 10, 1951, and Ser. No. 568,385 filed December 15, 1944 and since abandoned and Ser. No. 631,373 filed November 28, 1945 and Ser. No. 649,771 filed February 23, 1946, all hereinafter collectively called "my co-pending applications."

In my co-pending applications I have described the compositions, structures and methods of making a house, whereby the floors and walls and partitions and ceiling and roof comprise a preponderant bulk of fiber-reinforced aerogel or rigid foam as core material between denser opposite facings, sections of said facings including marginal rebates housing elements of a minimal frame. This invention carries the previous work further and describes a process for producing a molded panel having a highly cellular core of hard-setting foam that is drained of excess water and caused to be effectively self-bonded to opposite preformed facing sheets of fire and weather-resistant character.

A principal object of the invention is a process for producing a panel having plastic hard-setting opposite faces held in parallel planes while a plastic hard-setting core of lesser density is molded in situ to effectively fill the fixed space between opposite edges of said faces.

Another object of the invention is a process for producing a molded panel of non-loadbearing density having marginal rebates into which may be fixedly inserted loadbearing elements, as of lumber, steel or hard-set molded composition.

Another object of the invention is a process for producing a hard-setting panel comprising bound aggregate material selected from the group including grain straws and hulls, plant leaves and stalks, peat, popcorn slag, vermiculite, perlite, volcanic ash rock, flyash, diatomaceous earth, clay, asbestos, rockwool and wood wastes, and having a binder selected from the group including cold-setting siliceous and calcareous cements, gypsum and magnesite cements and thermosetting resins and adhesives.

Molded bound masses tend to stick to the molds. Concrete forms commonly are lubricated with thick mineral oils which tend to discolor the set molded masses and lessen subsequent adhesion to the exposed surfaces of subsequent protective coatings, as of stucco, paint and waterproofing agents. Thus, another object of the invention is a process for producing a molded panel having as a harmless residue or beneficial residue on the surface thereof, a parting agent or mold lubricant capable of aiding extraction of the panel from the mold whether the binder be cold or hot setting, and of increasing the surface resistance to moisture or the surface receptivity to subsequent protective coatings.

An exterior wall panel comprising layers of compositions of different character requires a careful balancing of these layers relative to the neutral axis of the panel, especially where organic constituents are employed. Otherwise harmful warping may result. Thus, another object of the invention is a process for easily producing a panel having molded and highly compacted facings of identical thinness on opposite sides of the core of lesser density.

Facings of greater density commonly are applied to a core of cellular stuff by coating the facings and/or the core with adhesives and laminating facings and core by the application of pressure on the facings toward the core. Due to unavoidable slight differences in thickness of the parts laminated, and in the viscosities of the adhesives under different weather conditions, and the variable adsorptive character of the surfaces coated, the thickness of panels so laminated is apt to vary substantially, whereas the very basis of successful prefabrication of houses is a reliance on precision dimensions. Thus, another object of the invention is a process for producing panel having parallel preformed opposite facings of dense hard-setting plastic composition or of sheet metal and a core of normally mass-shrinking foam containing the constituents of a mass-expanding gas generated after deposit of the core compositions in the mold, whereby a core cast in situ will swell to fill the fixed space between said facings and to adhere effectively to them while voiding from the mold excess water displaced by the expanding gas. By confining the facing sheets in a mold and exerting pressure outwardly to effect adhesion, each panel—whatever the slight variations in thickness of facing sheets and core—has the final precise thickness of the mold interior, and this thickness is identical for every panel made in the mold.

Another object of the invention is a process for producing a panel of solidified foam made by mixing a plastic foam of low cost but having a tendency to shrink somewhat after compaction in a mold with constituents tending to expand the foam in an amount greater than otherwise should have been the shrinkage: the constituents being selected from a group including stabilized aluminum sulfate-bicarbonate of soda mixture, and hydrogen peroxide, and aluminum powder.

Another object of the invention is a process for producing a hard-faced panel of solidified foam made by subtracting excess water from a plastic fiber-reinforced foam both prior to and subsequent to compaction in a mold.

Another object of the invention is a process for producing a panel made by the inclusion of organic fiber purified by treatment first in an aqueous oxide solution and next with an aqueous chloride solution before being bonded with Portland cement: or first with an aqueous chloride solution and next with an aqueous sulfate solution before being mixed with bonding materials.

Another object of the invention is a process for producing a moisture-resistant panel made by the inclusion of organic fiber first coated with a sprayed mist of hot asphalt and then dusted with lightweight silica or lightweight oxide material prior to being bonded with a cold-setting adhesive.

Another object of the invention is a process for producing a panel comprising a bound mass of organic fibers made by passing dry fibrous material through a mist-like spray of water and simultaneously or immediately thereafter through a dust-like jet of Portland cement powder and compacting the coated material in a mold.

The above and other objects of the invention will become apparent as the description proceeds.

By this invention I have devised a panel that comes clean from the mold and that is preferably made while opposite facing sheets and core are in a plastic state and without the use of adhesives other than those already part of the core and facing compositions, and by pressure exerted by expansive forces in the core and generated therein or conducted therein from outside the mold. By means hereinafter described, a minimum of mix water may be used both in the facing sheets and in the core itself, or a substantial amount of water may be used to facilitate mixing and to insure a generous foam; yet this excess water may be withdrawn after the mixing is completed both before and after deposit of the panel constituents in the mold. Excess water may be allowed to settle by gravity out of the core composition prior to being compacted in the mold, or it may be gently pressed or centrifuged in a sieve prior thereto. Subsequently excess moisture may be forced from the core by the force of a gas generated in or conducted into the mold or by mechanical means hereinafter described and shown in the drawings. These and other novel features and objects of the invention are hereinafter more fully described and claimed and the preferred forms of the panel and its method of fabrication are shown in the accompanying diagrammatic drawings, in which:

Fig. 1 is a front view of a typical wall, floor, partition, ceiling or roof panel with optional stiffening member integral therewith.

Fig. 2 is a side view of Fig. 1.

Fig. 3 is an enlarged section of wall panel taken on line 3—3 of Fig. 1.

Fig. 4 is an alternative section of wall panel showing marginal parts provided either as preformed inserts or cast-in-situ parts and supplied with means for joining contiguous panels.

Fig. 5 is an enlarged section of wall, floor, roof or ceiling panel taken on line 5—5 of Fig. 1 where the stiffening member, such as a post, beam, rafter or the like, is integral therewith and comprises either a premolded insert or a cast-in-situ element.

Fig. 6 is a section of metal-faced cellular-cored panel made of two oppositely disposed deformed sheets or pans joined by a connector of poorly heat-conductive material.

Fig. 7 is a plan of the shallow pan-like mold top (and bottom) into which the plastic preformed sheet or composition of the facing is positioned to be compacted prior to inclusion in the panel mold.

Fig. 8 is a section of a typical mold for molding the panel shown in Fig. 3, and shows the upper and lower pans held in fixed parallel relation by the water-filtering edges of the mold.

Fig. 9 is an alternate mold for molding a panel having substantial marginal rebates for housing load-bearing elements.

Fig. 10 is another alternate mold for molding a panel having an integral post, beam or the like of load-bearing density.

Figs. 1 and 2 show a typical panel for wall, partition, floor, ceiling or roof, the panel being roughly rectangular and much longer than wide and much wider than thick. A stiffening or load-bearing member 2, which may be either a beam or post, is made integral with some of the panels in a manner hereinafter described.

Fig. 3 shows the typical wall panel in section as having a rigid cellular core 3 strongly adherent to relatively thin opposite facings 4 of greater density. In many instances core 3 is of non-load bearing strength and serves merely as a web between facings 4, the aim being to reduce the weight of the panel and increase the thermal insulation efficiency which, in a panel 2" thick has been tested to show a "U" factor of as little as .275.

In the alternate section in Fig. 4, marginal parts 5 of greater density or strength than core 3, stiffen the panel and house the simple sawkerf 6, such as may easily be made with a carborundum or diamond saw, and into which a spline (not shown but described in my co-pending applications) may be bonded or otherwise fastened to provide a tight strong joint with contiguous panel 1b. In marginal part 5b, which may comprise a precast or preformed insert or be cast in situ, the sawkerf 7 is made by two angling cuts 8, 8' to have a throat 9 narrower than inner dovetail 10, which permits spline with keying extremities (not here shown but described in my co-pending applications) to be fastened against lateral withdrawal to another panel 5c, yet in such a manner that one panel may move vertically relative to the other in case the foundation supporting them settles more under one panel than under the other.

In Fig. 5, stiffening member 2, as beam or post, is shown integral with the panel and joined to thickened top facing 4b to give a rigid T section to the panel, the low-density parts 3b in this instance serving not as a web between opposite facings but largely as integral insulation and sound-deadening for the panel. The composition and character of panel facing 4b may be such as to particularly fit it for a special purpose. If used as a roof panel, the facing 4b in the plastic state may be molded to simulate the appearance of shingles; where used as a floor panel, the facing 4b may be molded to simulate a floor of tiles or planking; where used as a wall panel, the facing 4b may be molded to simulate a wall of ashlar stone, wood siding and the like.

The panel in Fig. 6 has opposite facings 4c of metal provided with grooves 13 which not only permit a greater expansion and contraction of the facing than that of core 3 without harm, but provides a structural bond between core and facing. Facings 4c may comprise two identical pans which receive in plastic form hard-setting core 3 and subsequently are joined back to back, sides 14 being provided with flanges 15 about which connector 16 of poorly heat-conductive material, such as a plastics strip, is bound to hold cores 3a and 3b spaced by void 17, the walls of groove 18 doing the spacing and providing space to receive a spline as described.

Up to this point, the description has concerned the general character of the panels to be formed. Figs. 7 and 8 show the means used to mold such a panel as that shown in Fig. 3 whereby opposite facings 4 may be thin, dense, strong and highly resistant to cracking, to moisture and to fire while core 3 may be of extremely low density and non-loadbearing in strength and highly insulative yet effectively joined to both facings while all are in the plastic state. In greatly reduced scale, Fig. 7 shows a plan of the shallow pan 19 comprising a rigid bottom plate 20 (which where the panel is large may be stiffened by angles and other means old in the art and not here shown) and raised side flange 21 set in a slight distance from outer margins of bottom plate 20. In Fig. 8 this pan is shown in larger scale in section as providing not only the bottom member but the top member of mold 22a. Similar pans provide the top and bottom members of mold 22b in Fig. 9, and a similar pan forms the top member of mold 22c in Fig. 10. Mold 22 has side members 23 provided with void 24 to hold excess water filtered from plastic core composition 3 through the grid of extremely fine apertures 25 housed by the thus porous filterplate 26 which is held flush with inner edge of flange 21 by side parts 27 of void 24. The four side members 23 hereinafter called marginal stops are fitted accurately between the co-active flanges 21 of top and bottom pans 19 and may be fastened securely by means (not shown) old in the art. Plastic material for core 3 may be deposited in void 28 either prior to fastening in place of all side members 23 or by means of injection ports 29 in one of those side members 23. Closures (not shown) for the ports may be closed after void 28 has been filled as hereinafter described.

Mold 22b shows how the panel shown in Fig. 4 is molded. Side member 23 extends inwardly past flange 21 and between marginal parts of opposite facings 4 to provide a substantial marginal rebate 30 in the edge of the panel. Subsequently marginal part 5 of greater strength than core and of preshaped material, such as wood, metal or molded plastic composition, may be bonded in the rebate 30, or the rebate may be filled with plastic hard-setting composition which effectively seals the core between opposite facings. Where substantial voids are desired between opposite sides of the core, these may be supplied by void-core in form of pipe 31 which may contain tiny apertures 32 for conducting a gas from outside the mold into the core for expansive purposes, or pipe 31 may be made of expansible material whereby pressure therein will expand the pipe to create expansive pressure in the core to force excess moisture therefrom and increase adhesion of core and opposite facings. Subsequently the voids created by removal of pipe 31 will aid in circulating air therethrough to hasten drying out of the panel and will decrease the weight thereof in shipment. In Fig. 10, bottom pan 19b has depression 33 in which the stiffening member is cast or placed and top and bottom pans are locked together so that plastic surfaces of facing 4 and of stiffening member 2 are forced together to become one.

While the invention primarily concerns molded panels comprising parts of relative low density made integral with other parts of much higher density, the invention is not restricted to such panels, since even panels of a single density, loadbearing or non-loadbearing, may utilize much of the technique herein described. But emphasis is on the preferred manner of making a single panel of low weight relative to strength and of low cost relative to excellent structural, thermally insulative, weatherproof, fire-resistant and aesthetic qualities by employing two or more plastic compositions of different character at the same time.

In general terms, it may be said that pan 19 receives facing 4 in any one of several forms. Facing 4 may comprise a preformed plastic sheet of asbestos-cement board made by a paper-making screen passing through a slurry and depositing felted layers of fiber and binder on a board-forming cylinder prior to compacting the sheet in the flat under substantial pressure, as is the common practice in making asbestos-cement shingle board. In an actual manufacturing operation, such a plastic sheet could go directly from the cylinder into pan 19. This would permit a sheet of considerable thinness to be employed and eliminate the costly handling otherwise necessary. A large number of sheets in their respective pans may be simultaneously compressed to substantially decrease the water content and increase the density and strength. In an alternate manner, the very slightly dampened ingredients of facing 4 and comprising, for example, asbestos, rock wool, woodpulp and binder, may be compressed in pan 19. Again, fibrous aggregated and hot or cold-setting binders are mixed into a stiff mass, rolled out flat like piecrust dough and deposited in the pan to be further compacted therein by pressure variously applied.

Whatever method is used to fill pans 19, the ability to make the pans of identical depth, though this depth be as little as one thirty-second of an inch or as much as one-half an inch, permits the facings 4 on opposite sides of the panel to be of identical thickness so as to permit an accurate balancing of forces on opposite sides of the neutral axis of the panel to prevent warping. Once filled and compacted, two such pans are locked in fixed spaced relation in parallel planes and separated by side members 23 whereupon void 28 between opposite facings 4 is filled through one open side of form 22 or through ports 29 with a plastic composition that sets or is set to rigidity to provide core 3 having highly cellular structure. By means, hereinafter described, of the expansive force of a gas generated in or conducted into the core composition after being deposited in the mold, the outer surfaces of the core mass 3 are pressed adherently against the inner plastic parts of facings 4 until the binders therein cause facings and core to knit and become integral. Excess water in the core-composition, under the pressure thus exerted, escapes through filterplate 26 by means of apertures 25 and is received and held in void 24 until the mold is disassembled. Other means are employed to remove excess water both before and after the core material is placed in mold 22. Any foamy aqueous mixture contains a certain amount of bubbles which are overloaded with moisture. This is demonstrated visually by depositing such a mixture in a glass jar and watching the clear water accumulate in the bottom of the jar by drainage of excess water from the foam. Some of this excess water may be drained from the foamy constituents of core mass 3 prior to entrance into the mold by permitting the foam to stand and drain, by gently pressing the foam short of bursting the bubbles, and by gentle centrifugal motion in a sieve. Dry and highly absorbent aggregate materials are mixed into the foam to take up excess moisture. Facings 4 may be mixed dry enough to readily absorb some water from the excess in the core composition. Voids 24 may be connected with a vacuum pump (not shown) and excess water may be sucked from the core composition by means old in the art. By the proper combination of these means, I have found it possible to rid the core composition of what otherwise would be harmful excesses of water in the mold.

The invention is now described in more specific terms in a number of examples of panels made according to the invention.

*Example 1*

The facing sheet composition comprises approximately 1 part (by weight) asbestos fiber, 2 parts Portland cement and 3 parts water mixed into a dough and rolled out flat, deposited in pan 19 and compacted under substantial pressure by a press (not shown) having an absorption pad, or filtering apertures such as 25 in the pan itself, to assist in forcing excess water from facing sheet 4.

Prior to compressing dough for the facing sheet 4 in pan 19, the inner surface of the pan is coated with a parting agent which is permitted to dry and harden on the surface but which the moisture in the facing sheet gradually will soften again and turn into a lubricant for the pan surface. For this purpose, I have found a number of materials suitable. One part (by weight) of sodium alginate dissolved in 250 parts of water may be sprayed in a thin mist over the inner surface of pan 19 and permitted to dry before depositing therein the facing composition 4. 10–20 parts of glycerine or ethylene glycol or ethylene glycol silicate may be mixed with the alginate solution and/or 1–20 parts of a water-soluble oil. Such an agent is effective when used either with cold-setting or thermo-setting binders. Even with the inclusion of a substantial amount of the non-drying polyhydric alcohol or oil, a relatively "dry" film of alginate sets on the surface of the pan and other parts of mold 22, yet the moisture in the plastic mixtures deposited in mold 22 redissolves the alginate and permits it and the additions made to it to lubricate the mold surface and serve as a parting agent easing removal of the molded panel from the mold. Meantime, so little material of a harmful nature is left on the faces and edges of the panel that subsequent effective application of protective coatings, such as stucco, paints and waterproofing agents, is assisted; in fact, the ethylene glycol silicate is itself a protective coating in contrast to the common practice of molding panels in molds lubricated with thick, messy mineral oils. The parting agent may be utilized not only to lubricate the molds but to increase the rigidity and density of the facing sheet. Where the binder is Portland cement, the parting agent may comprise an aqueous solution of sodium silicate and magnesium silicofluoride, sprayed on the mold face and dried or permitted to be immediately absorbed into the surface of the plastic constituents of the panel. When wet, such a solution acts as a parting agent. If it is desired to increase the moisture resistance of the facing sheet, the parting agent may comprise an aqueous solution of phenol-formaldehyde thermo-hardening resin which is sprayed on the mold faces and dried with gentle heat short of setting the resin. Subsequent absorption of moisture from the plastic mixtures deposited in the mold will then redissolve the resin but so slowly that it will be absorbed into the panel surface at a rate permitting the normal set of the Portland cement binder. Subsequently, after removal of the panel from the mold, this residue of resin in the surface of the panel may be thermo-hardened by heat to better the character of the panel. Meantime, it has served in its moistened state as a mold lubricant and parting agent. A molded panel having a surface residue of beneficial parting agent is thus an important feature of the invention.

The core composition comprises approximately the following ingredients (by weight): 5 parts yellow-pine wood pulp, 10 white pine sawdust fine, 30 ground asbestos, 1 lime, 1 bentonite, ¼ casein, $\frac{1}{10}$ sodium salt of an alkyl napthalene sulfonic acid, ½₀ wetting agent are beaten in 675 warm water to a foam and there are added 30 parts flyash, 20 high alumina cement, 20 diatomaceous earth and 450 high early strength Portland cement, 10 activated bauxite, ½ terra alba and 8 cal. chloride. The beating is continued at high speed and at slow speed there are added 40 parts cottonwood wool and 85 wheat straw, the latter having been previously put through a hammermill (¼" screen) and soaked first in cal. chloride solution and then in aluminum sulfate solution and dried. At the very last, ¼–2 parts aluminum powder are beaten into the mixture which is then deposited in void 28 between spaced plastic facings 4 and side members 23 of mold 22. (If the amounts given are turned into grams, the composition will have a mass about 6 x 6 x 2 inches or ½₄ of one cubic foot and will weigh when set and dry about 1¾ lbs. or 42 lbs. per cu. ft. With dense opposite facings fixed to such a core, a wall of load-bearing strength is achieved.)

After void 28 has been completely filled with the core mixture, the mold is completely closed and hydrogen gas evolved by the reaction of the aluminum powder and the caustic lime in the cement exerts internal pressure on the core to press its opposite surfaces outwardly against the spaced plastic facings 4 and against filter plates 26, through apertures 25 in which excess moisture in the foam is voided to make room for the gas evolved. Because of the relative high binder content of plastic facings 4 and the pressure exerted, an effective bond is secured between core and facings and what is in fact a monolithic panel is produced in contrast to the type of panel made by laminating core and facings by means of a glue or varnish and pressure on the facings toward the center of the core. Where such a panel is cast in the mold shown in Fig. 9, a peripheral rebate 30 may be provided between the outer margins of the facings 4 and the outer edges of the core 3 and marginal parts 5, in the form of a milled lumber frame may be bonded into rebate 30 to provide a peripheral stiffening, greatly increasing the loadbearing character of the panel. By decreasing the cement from 450 to 350 and increasing the water from 675 to 800, a non-loadbearing core is provided that has a density of as little as 25 lbs. per. cu. ft., and yet a core that has sufficient strength to serve as a web between opposite facings 4 and opposite marginal parts 5.

*Example 2*

The facing sheets 4 are standard asbestos-cement board, taken directly from the forming machine in the plastic state into pans 19 and compressed therein, or taken from the hydraulic press employed in making sheets for shingles and placed in pan 19 and into mold 22.

The core composition is a foam made by beating a mixture of the following ingredients in parts by weight: 500–800 water, 10–75 fine fibrous material (to provide a sustaining lattice of crossed fibers in the foam) and 1/50–10 parts of a surface tension modifier selected from the group including sodium lauryl sulfate, saponin, emulsified resin synthetic or natural, polyvinyl alcohol, emulsified asphalt or pitch or fatty acid, casein, latex, and 300–500 Portland cement and ½–50 hardening agent selected from a group including the concentrated constituents of calcium sulfo-aluminate and dicyamdiamide. To this cementitious foam are added 75–500 parts of dry aggregate material selected from the group including grain straws and hulls, plant leaves and stalks, peat, popcorn slag, expanded vermiculite, expanded perlite, volcanic ash rock, rigid foam granules, flyash, diatomaceous earth, clay, mineral fiber and wood wastes. Prior to placing in mold 22, a gas-making substance in the amount of 1/50 to 5 parts and from the group including aluminum powder, hydrogen peroxide and stabilized aluminum sulfate-bicarbonate of soda solution, such as is used in fire-extinguishing compounds, are mixed into the core composition and it is deposited in the form to swell in the closed form and adhere to the plastic facing sheets therein.

*Example 3*

The facing sheets 4 are a slightly water-dampened mixture of fine wood pulp and asbestos fiber and rockwool, the asbestos comprising from one-third to one-half by weight. One part of this mixture is dampened by a fine mist-like spray of water and a jet of 2½–4 parts of dry cement powder is directed against this surface moisture on the fibers. The cement may contain up to 10 percent by weight of a hardening admix comprising clay-like constituents high in alumina and ferric or titanium oxides and hydroxides and available as byproducts from the manufacture of aluminum together with calcium or aluminum sulfate and calcium chloride. The thus coated fibers are deposited in a hopper-like frame (not shown) about flange 21 and pressed down to be compacted flush with flange 21. Two pans thus filled are then fixed in mold 22 ready to receive the core composition therebetween.

The core composition is similar to that in Example 2 except that the organic fibers include finely divided fiber bundles which have been pre-treated with asphalt to render them more moisture resistant. This is done in one of two ways. In one, the fibers are beaten in an aqueous solution of asphalt and dried to set the emulsion in the pores and on the surface of each fiber bundle. In the other, the finely divided fiber-bundles are subjected to a mist-like spray of hot asphalt. I have taken fibers coated by either method, slightly warmed the asphalt coating and then dusted the fibers with a lightweight silica, such as diatomaceous earth, or with a lightweight oxide by-product material such as Alorco Insulating Powder R-20, which grit assists the bonding of the fibers with cold-setting adhesives, such as Portland cement.

*Example 4*

The facing composition comprises wood pulp ⅓ part, asbestos ⅔ part, Portland cement 2–3 parts, water soluble phenol-formaldehyde resin 1/100 to 1/10 part and water sufficient to make a very stiff dough which is compacted in pan 19.

10–20 parts fine pine fiber, 30 ground asbestos, 10 clay residue from the extraction of metal aluminum, 2 bentonite, 1 casein glue and 1 dicyamdiamide are beaten in a high speed mixer with 800 water and to the foam 4 Soda Metasilicate are added with further beating together with 300–500 high early strength Portland cement. To this foamaceous paste are added 50–500 parts of dry aggregate materials selected from the same group as the aggregate materials in core of Example 2 and including wheat straw, sunflower and corn stalks and prairie grass hay which had been run through hammermill (⅛ screen) and soaked for 1–3 days in limewater and then in an aqueous solution of a chloride selected from the group including aluminum, calcium, ferric, zinc and sodium chlorides and dried before inclusion in the core mixture (for accuracy in weighing). At the last moment before being deposited in the mold, this core composition is mixed with from 1/100 to 10 parts of a gas-making ingredient selected from the same group as used in Example 2. Subsequently the mold 22 is subjected to heat, part applied to the facings 4 immediately after the mold is closed as by circulating steam in steam-jacket (not shown) in outer part of pan 19 to partially set up or stiffen the thermo-hardening resin in facings 4 and partially set up the casein-soda silicate-dicyamdiamide adhesive in the core to permit quick removal of the panel from the mold. Thereupon the balance of the moisture in the panel will hydrate and cure the cement and subsequent exposure of the panel to the balance of the heat will dry out the panel and rigidly set the thermo-setting resin and the soluble-silicate adhesive therein.

*Example 5*

The facing sheets 4 comprise felted fiber and plastic binder compacted in pan 19 and providing when hard-set spaced moisture-barriers highly resistant to combustion.

The multicellular core is a foamaceous hard-setting plastic composition containing the following ingredients (by weight): 15 parts fine pine fiber, 20 asbestos, ½ bentonite, ½ lime, ¼ polyvinyl alcohol, ⅟₂₀ wetting agent, ⅟₁₀ sodium alkyl naphthalene sulfonic acid, ¼ water soluble phenol-formaldehyde resin, 10 diatomaceous earth, 3 bauxite residue, 4 aluminous cement, ⅛ terra alba, 60 Portland cement, ¼ dicyamdiamide, ¼ casein, 650 water, 20 cottonwood wool, 70 South African long fibered asbestos.

The panel is cast with a marginal rebate completely around the panel and subsequently the rebate is filled with a moisture-impervious hard-setting plastic that seals the core against the entrance of moisture thereinto.

Many other examples could be cited wherein gypsum, magnesite cement, sodium silicate and other binding agents are substituted for the Portland cement binders herein described. The Portland cement panels appear stronger, lighter, more moisture-resistant and of lower cost. Other materials have been used as facing sheets. The metal facings shown in Fig. 6 are of thin sheet aluminum to which the core compositions herein described naturally adhere. Facings of sheet copper or iron, of resin-impregnated asbestos paper and the like have also been used. But initial cost and low maintenance cost considered, the fiber-cement facings and particularly the mechanically felted sheet described in the cited examples have proved preferable. The wide choice of aggregate materials for the core compositions permits use of whatever lightweight by-product and waste materials may be locally most abundant at any given production site throughout the world; since not the least of the objectives of the invention is a system of construction practical of application anywhere that Portland cement is available.

In the examples cited, the invention is seen to provide a panel of a special character in that it is molded to precision dimensions not easily secured by laminating practice, and a panel in which a lightweight plastic core is made to adhere to opposite facings by internal pressure set up in the plastic core material after being deposited in the mold between the preformed facing sheets. Other details of structure and composition and method have been described in sufficient detail to demonstrate that the invention makes possible the attainment of the cited objects thereof. One aspect of the invention, important if not stressed, is that it further integrates and clarifies features of the inventions described in my co-pending applications. As herein described, the invention is not to be interpreted as in any sense limited to the use of a stationary mold, since the invention may also apply to the use of a pair of spaced belts moving in fixed parallel planes, each belt being provided with inwardly turned opposite edges (flange 21) as are pans 19 in mold 22.

In addition to the binders described as used in the cited examples, asphaltic, pitchy, resinous and synthetic binders may be employed both in the facing and core compositions. By varying the form, ingredients and details of structure and composition, panels of the types shown in Figs. 1 to 6 inclusive and in my co-pending applications are made which are specially adapted to widely varying uses in different climates. A panel highly resistant to arctic cold is also resistant to tropical heat. A very fire-resistant facing may be provided for a very combustible core. A very moisture-resistant skin may be provided for a very absorptive core. A very sound-deadening face may be provided for a very fire-resistant core. By means of the marginal rebates and inserts therein, loadbearing and stiffening elements of structure may be supplied hidden in the outer margins of the panel. Joining means highly resistant to lateral disengagement but permitting relative vertical movement of adjacent panels permit self-adjustment of the panels in a wall resting on an unevenly settled footing. Posts, beams and rafters are cast to be integral with the panels and in a manner that permits what otherwise would be only a curtainwall or non-loadbearing panel to fulfill its share in the support and stiffening of the total structure of which it is a part.

It is thus to be observed that various changes in the form and in the means of forming the panels herein described may be integral parts of a single invention and that these variations may be made without departing from the spirit and scope of the invention as set forth in the appended claims. And it will be understood that any of the variants and modifications in the molded panel as herein described and in the components and production thereof may be used separately and in any desired combination.

Having thus fully described my invention, its utility, composition and means of fabrication, what I claim and desire to secure by Letters Patent of the United States is:

1. A process of molding a cellular unit from a plastic cementitious composition which comprises, forming a mix comprising a cementitious binder and water, confining said mix on all sides with rigid mold walls, certain of said walls being porous, applying a gas under pressure interiorly of and in contact with said confined mix to displace the water from within the confined mix and force the displaced water through the porous walls and simultaneously force the binder toward the mold walls to shape the binder.

2. The process of claim 1 wherein said mix includes constituents which react chemically to generate said gas.

3. The process of claim 1 wherein said gas is conducted through a hollow passage from outside the mold after said mix has been confined with said walls.

4. The process of claim 1 wherein passage of said displaced water through one of said porous walls from one side thereof under gas pressure within said confined mix is assisted by the application of suction to the opposite side of the porous wall.

5. A process of making a molded panel having a cellular inner core between denser faces which comprises, inserting a dense sheet of flexible material into a shallow cavity of a rigid backing plate, inserting a second sheet of flexible material into a similar cavity in a similar second backing plate, assembling the two backing plates with porous filter plates to form a molding cavity completely surrounded by said plates and said sheets facing each other and spaced from each other by said filter plates to form two walls of the cavity, one of said plates having a filling orifice therein, preparing a plastic mix comprising cementitious binder and water, filling the cavity with said mix, closing the orifice, applying gas under pressure interiorly of and in contact with said mix to press said mix against the sheets to bond the sheets and binder and to force the water through said porous filter plates and removing the plates from the molded panel.

6. A process of molding a panel having parallel outside faces denser than the core mass fixed between the faces which comprises, equally covering two parallel inside walls of a rigid mold with the denser constituents of said faces, preparing a plastic core mix of liquid and cementitious binder, confining said mix on all sides and between said denser constituents with rigid mold walls, some walls in direct contact with said mix being porous, applying gas under pressure interiorly of and in contact with said confined core mix to displace liquid from within the confined mix and force the displaced liquid through the porous walls and simultaneously force the binder toward the mold walls to shape the binder and unite said core mix with said denser face constituents.

7. A process of molding a unit mass of plastic cementitious composition to house an inner hollow which comprises, preparing a plastic cementitious mix of liquid and finely divided solid constituents of said mass, confining said mix on all sides with rigid mold walls, certain of said walls being porous, utilizing a hollow perforated core member extending between said walls to convey a gas under pressure into the mold to be in contact with and to displace liquid from within the confined mix and force the displaced liquid through the porous walls and simultaneously force the solids toward the mold walls to shape the solids, and removing said hollow core member from the molded mass to leave a corresponding hollow housed by said mass.

8. A process of molding a product having outside surfaces denser than the cellular core therebetween which comprises, forming two separate mixes each comprising a cementitious binder and water, one mix being much more stiffly plastic than the other, confining said two mixes on all sides of the product being molded with rigid mold walls, certain of said walls being porous, the stiffly plastic mix covering a number of said walls and the other mix in direct contact with a number of said porous walls, applying gas under pressure interiorly of and in contact with the confined less stiffly plastic core mix to displace water therefrom and force the displaced water through the porous walls and simultaneously bond said two mixes fixedly together.

9. A process of molding a panel to have a highly porous core fixed between a pair of facing sheets of stronger, more flexible and much more moisture-resistant material which comprises, rolling out a plastic cementitious composition to form sheets of uncompacted character, compacting one sheet against a rigid backing plate, compacting a second sheet against a similar second backing plate, preparing a foamaceous mix of liquid and hardening cementitious core ingredients, confining said mix in a molding cavity made by assembling the two backing plates with porous filter plates and with sheets facing each other across said cavity, applying gas under pressure interiorly of and in contact with said confined mix to displace liquid from within the confined mix and force the displaced liquid through the porous filter plates and simultaneously force said cementitious core ingredients to bond firmly with said sheets, and removing the plates from the molded panel.

10. A process of making a frameless molded panel having a dense skin and cellular core of slow-setting plastic composition which comprises, forming a pair of facing sheets of flexible material, stiffening said sheets by causing them to temporarily adhere to individual rigid backing plates, preparing a plastic mix of solidifying foam constituents of said core, said constituents comprising cement, fiber particles and water, confining said mix on all sides with rigid mold walls, two thereof consisting of said backing plates holding said sheets parallel and in direct contact with said mix, certain of said walls consisting of porous filter plates, applying a gas piped into said confined mix and in direct contact therewith to displace the water from within the confined mix and force the displaced water through the porous filter plates and simultaneously force the cement toward the mold walls to shape the cement and bond said mix and said facing sheets fixedly together.

11. The process of claim 10 wherein one panel edge next to one of said filter plates has surfaces extending in a number of different planes.

12. The process of claim 10 wherein parallel opposite panel faces of greatest area are smooth and flat and a rebate between the outer margins of said opposite faces is formed by said filter plates to extend completely around the panel to subsequently receive therein a filler stronger and denser than the hardended core of said panel.

References Cited in the file of this patent

UNITED STATES PATENTS

| Number | Name | Date |
|---|---|---|
| 1,297,906 | Quass | Mar. 18, 1919 |
| 1,434,091 | Claussen | Oct. 31, 1922 |
| 1,502,501 | Gumowski | July 22, 1924 |
| 1,552,064 | Lake | Sept. 1, 1925 |
| 1,813,909 | Brainard et al. | July 14, 1931 |
| 1,902,178 | Nelson | Mar. 21, 1933 |
| 1,951,344 | Caldwell | Mar. 20, 1934 |
| 2,009,056 | Schaffert | July 23, 1935 |
| 2,031,568 | Mason | Feb. 18, 1936 |
| 2,079,664 | Seigle | May 11, 1937 |
| 2,092,106 | Coddington | Sept. 7, 1937 |
| 2,235,176 | Schless | Mar. 18, 1941 |
| 2,252,157 | Bergin et al. | Aug. 12, 1941 |
| 2,255,511 | Muller | Sept. 9, 1941 |
| 2,311,358 | Baily | Feb. 16, 1943 |
| 2,316,752 | Atkinson et al. | Apr. 20, 1943 |
| 2,351,615 | James | June 20, 1944 |
| 2,376,653 | Boyer | May 22, 1945 |
| 2,392,551 | Roe | Jan. 8, 1946 |
| 2,394,146 | Brunton et al. | Feb. 5, 1946 |
| 2,409,094 | Ahles | Oct. 8, 1946 |
| 2,421,721 | Smith et al. | June 3, 1947 |
| 2,460,309 | Rapp | Feb. 1, 1949 |
| 2,528,643 | Dubbs | Nov. 7, 1950 |

FOREIGN PATENTS

| Number | Country | Date |
|---|---|---|
| 369,241 | Great Britain | of 1932 |
| 436,287 | Great Britain | of 1935 |
| 561,716 | Great Britain | of 1943 |